United States Patent [19]

Baltare

[11] Patent Number: 4,552,254
[45] Date of Patent: Nov. 12, 1985

[54] DRUM BRAKE SPIDER ASSEMBLY WITH CANTILEVER ANCHOR PIN

[75] Inventor: Gunnar Baltare, Portage, Mich.
[73] Assignee: Eaton Corporation, Cleveland, Ohio
[21] Appl. No.: 506,926
[22] Filed: Jun. 22, 1983
[51] Int. Cl.$^4$ .......................... F16D 51/20; F16B 2/14
[52] U.S. Cl. .................................... 188/328; 188/341; 188/206 A; 411/531
[58] Field of Search ............. 188/327, 328, 324, 330, 188/332, 206 A, 333, 341, 337, 338; 411/531, 532, 533, 534, 535, 536, 537, 538, 539, 545, 546, 10, 176

[56] References Cited

U.S. PATENT DOCUMENTS

| | | | |
|---|---|---|---|
| 2,028,583 | 1/1936 | Bendix et al. | 188/328 |
| 2,277,335 | 3/1942 | Loweke | 188/327 |
| 2,311,765 | 2/1943 | Loweke | 188/327 |
| 3,081,844 | 3/1963 | Mathews et al. | 188/78 |
| 3,136,390 | 6/1964 | Zukowski | 188/341 |
| 3,187,621 | 6/1965 | Turner | 411/10 |
| 3,497,037 | 2/1970 | Deibel | 188/329 |
| 3,650,360 | 3/1972 | King et al. | 188/330 |
| 3,699,637 | 10/1972 | Rosick | 411/176 |
| 3,941,218 | 3/1976 | Torii | 188/106 F |
| 4,209,084 | 6/1980 | Peck | 188/250 |

FOREIGN PATENT DOCUMENTS 0578357  6/1946  United Kingdom ................ 411/531

Primary Examiner—Bruce H. Stoner, Jr.
Assistant Examiner—Alvin Oberley
Attorney, Agent, or Firm—C. H. Grace; H. D. Gordon

[57] ABSTRACT

An improved spider assembly (46) for expanding shoe drum brakes (10) of the type utilizing cantilever mounted anchor pin members (18) is provided. The anchor pin includes a pivot surface portion (62) and a slightly enlarged headed portion (66) extending from the outboard side of the spider member (14). A specially configured washer (80) is slidably received upon the pivot surface portion of the anchor pin and is of a sufficient outer diameter (82) to axially retain the brake shoe webs (26) upon the anchor pin. The washer (80) is provided with a radially extending portion (94) and an axially extending portion (84) extending from the outer periphery of the radially extending portion at a diameter (86) greater than the outer diameter (88) of the anchor pin. The difference between the axial length (70) of the pivot surface portion and the axial width (72) of the brake shoe web is greater than the axial thickness (96) of the radially extending portion of the washer but less than the total axial length (98) of the axially extending portion (94) and the radially extending portion (84) of the washer thereby assuring that the brake shoe can not be assembled to the anchor pin unless the washer 80 is properly positioned thereon.

9 Claims, 10 Drawing Figures

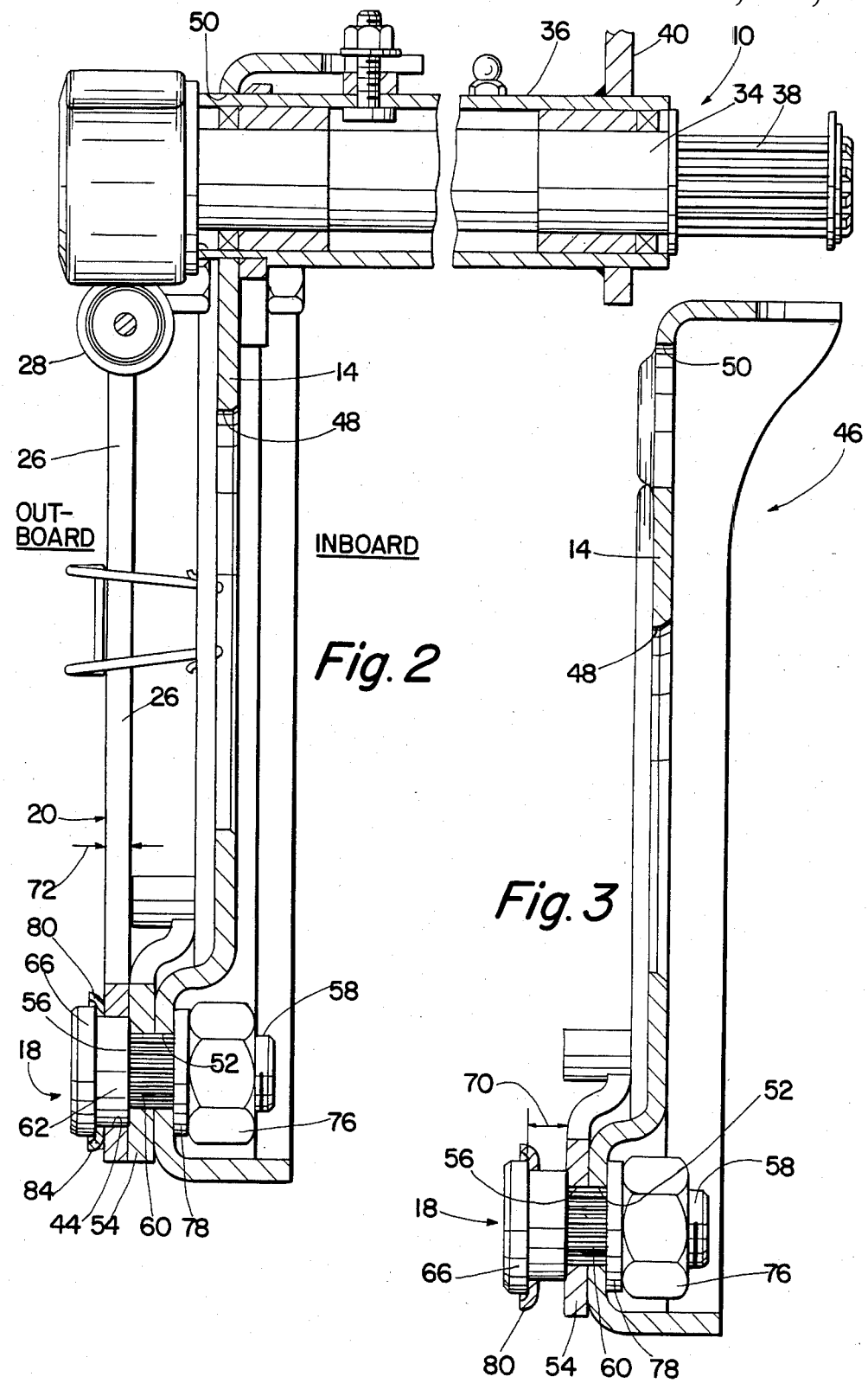

DRUM BRAKE SPIDER ASSEMBLY WITH CANTILEVER ANCHOR PIN

BACKGROUND OF THE INVENTION

1. Field of the Invention

The present invention relates to a spider assembly for an expanding shoe drum brake and more particularly relates to a spider assembly for an expanding shoe drum brake of the type utilizing a cantilever mounted anchor pin or pins.

2. Description of the Prior Art

Expanding shoe drum brakes, especially air or hydraulically actuated drum brake systems wherein arcuate brake shoes are pivotably mounted to a support or spider member non-rotatably secured to a portion of a wheeled vehicle for pivotal rotation about an anchor member or members into frictional engagement with a rotating annular brake drum for the purpose of retarding the velocity of the wheeled vehicle by the use of a brake actuating member, such as a displacable cam element, are well known in the prior. The brake actuating member, usually a rotatable cam element or a linear wedge element, is located between the adjacent ends of the pivotal brake shoes and secured to a rotatable cam shaft or to a linear actuation shaft, respectively, for translating oscillitory, generally linear motion from a power source, such as an air motor or the like, to the brake shoes. Examples of such prior art cam actuated drum brakes may be seen by reference to U.S. Pat. Nos. 3,497,037 and 3,096,857, both of which are hereby incorporated by reference.

The prior art cam and/or wedge actuated drum brakes may be classified as straddle type drum brakes wherein the web members of the brake shoes straddle the spider member or cantilever type drum brakes wherein the anchor member is cantilever mounted to the spider member and the brake shoe web or webs are located on one side of the spider member only. The present invention relates primarily to drum brakes of the cantilever mounted anchor pin type.

Cantilever mounted anchor pin type drum brakes are known in the prior art and typically comprise a spider member for non-rotational mounting to a portion of a wheeled vehicle and an anchor pin or pins cantilever mounted to the spider member and extending from one side thereof for providing a pivotal mounting of the brake shoes. As the cantilever mounted anchor pin type drum brake requires that the brake shoes be axially restrained on the anchor pin, the anchor pins were typically provided with an enlarged headed portion spaced from the surface of the spider member from which the anchor pin extends by a distance generally equal to the width of the brake shoe web or webs. As such anchor pins were typically of a complicated and specialized structure, they were usually produced by machining of a bar of stock having a radius at least as great as the enlarged headed portion of the anchor pin. As the cost of materials and the cost of machining such anchor pins was significant, the prior art anchor pin structures for cantilever mounted type anchor pins was totally satisfactory.

SUMMARY OF THE INVENTION

In accordance with the present invention the drawbacks of the prior art have been overcome to the extent that an improved anchor pin structure for an expanding shoe drum brake assembly having cantilever mounted anchor pin or pins, the structure of which pins allows the manufacture thereof with a considerable degree of savings in material and manufacturing costs, is provided.

The above is accomplished by utilizing an anchor pin having a first end for mounting in the spider and a second end spaced from said first end by a distance generally equal to the width of the shoe web or webs to be supported and being of only a slightly larger outer diameter than the pivot support surface of the anchor pin. Preferably, the anchor pin is removably mounted to the spider. A relatively low cost, specially configured washer is provided having a centrally located aperture therethrough of an inner diameter smaller than the outer diameter of the second end of the anchor pin to provide a larger bearing area for axial restraint of the brake shoe webs and also carrying special projections to prevent misassembly of the brake shoe webs to the anchor pin.

Accordingly, it is an object of the present invention to provide a new and improved expanding shoe drum brake of the cantilever mounted anchor pin type utilizing an improved drum brake spider assembly consisting of an improved anchor pin structure and specially configured washer carried thereby.

This and other objects and advantages of the present invention will become apparent from a reading of the detailed description of the preferred embodiment taken in connection with the attached drawings.

BRIEF DESCRIPTION OF THE DRAWINGS

FIG. 2 is a side view substantially in section taken along substantially the lines 2—2 in FIG. 1.

FIG. 3 is a side view partially in section of the spider assembly of the present invention.

DESCRIPTION OF THE PREFERRED EMBODIMENT

Figure 1:
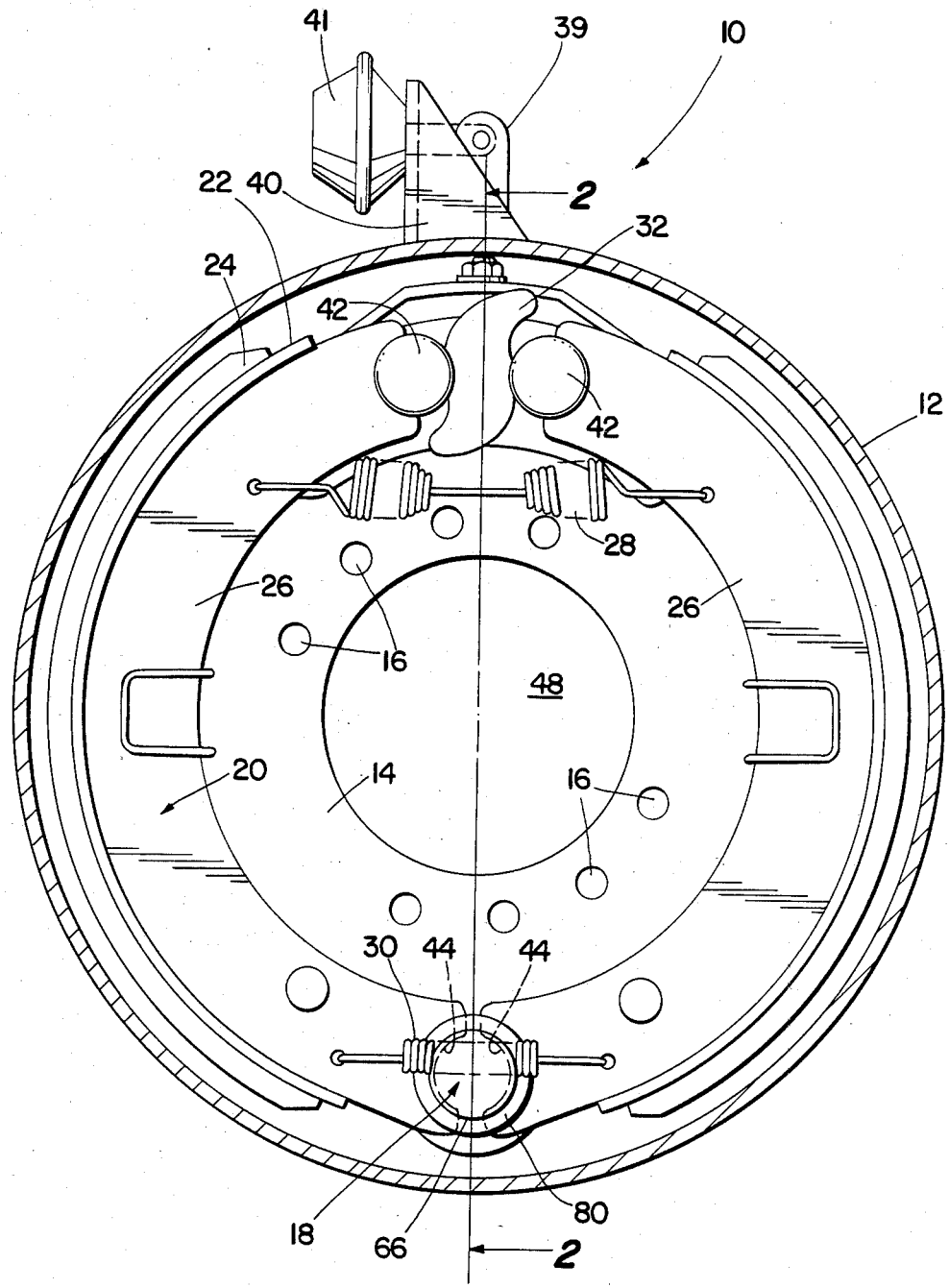
FIG. 1 is a plan view of the outboard side of an expanding shoe drum brake of the cantilever mounted anchor pin type utilizing the spider assembly of the present invention.
Figure 4:
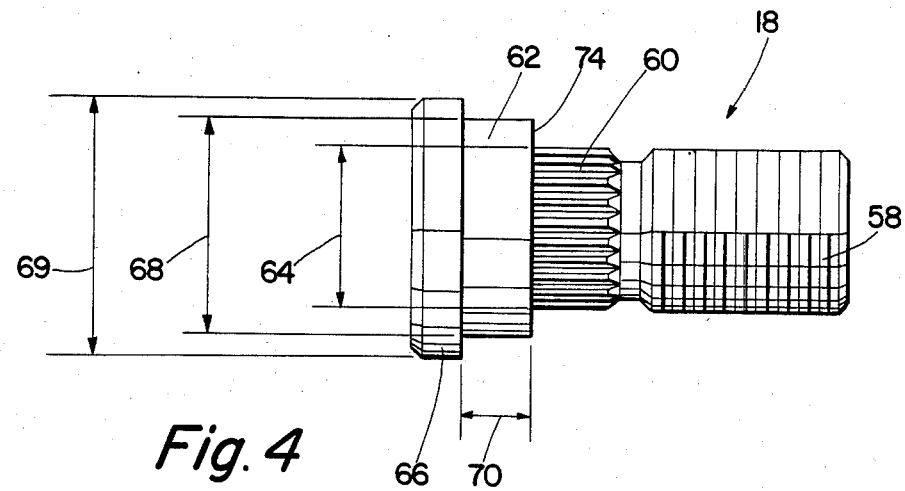
FIG. 4 is a side view of the anchor pin of the present invention.

Certain terminology will be used in the following description for convenience in reference only and will not be limiting. The words "upwardly," "downwardly," "rightwardly," "leftwardly," "clockwise" and "counterclockwise" will designate directions in the drawings to which reference is made. The words "inwardly" and "outwardly" will refer to directions toward and away from, respectively, the geometric center of the device and designated parts thereof. The terms "inboard" and "outboard" will refer to directions toward and away from, respectively, the center of the vehicle to which the brake is mounted. Said terminology will include the words above specifically mentioned, derivatives thereof and words of similar import. The term "brakes" as used herein is intended to include varius frictional coupling devices such as clutches, brakes and the like.

In FIGS. 1 and 2 an expanding shoe drum brake assembly 10 utilizing the spider assembly with cantilever mounted anchor pin of the present invention is illustrated. For illustrative purposes only, the drum brake assembly 10 illustrated is of the "S" cam type utilizing a single anchor pin and brake shoes having a single web. It is understood, however, that the present invention is equally applicable to drum brake spider assemblies with cantilever mounted anchor pins for those expanding shoe drum brake assemblies utilizing other brake actuating means, such as wedge actuators and the like, to those drum brake assemblies utilizing twin anchor pins and to those drum brake assemblies utilizing brake shoes having a plurality of webs.

Drum brake assembly 10 comprises a generally annular rotatable drum 12 (shown in section), a brake support member or spider member 14 non-rotatably secured to portions of the vehicle by a plurality of suitable fasteners such as bolts or the like (not shown) receivable through bolt circle holes 16, a brake shoe pivot or anchor pin 18 secured to the spider 14 in a cantilevered manner, a pair of opposed, generally arcuate, brake shoes 20 including a brake lining support or table 22, a brake lining 24 of suitable friction material and webs 26, brake shoe return spring 28, brake shoe retention spring 30 and a cam element 32 for causing generally radially outward pivotal movement of the brake shoes 20 and brake linings 24 about the pivot or anchor pin 18 and into engagement with the brake drum 12 for retarding movement of the vehicle in a known manner.

Also shown is a cam shaft 34 to which cam 32 is non-rotationally fixed or integral therewith. The cam shaft is received within a cam shaft tube 36 which is fixed to the spider 14. The rightward end 38 of the cam shaft 34 is provided with splines or the like for non-rotational receipt of a lever member 39 such as the lever body of an automatic or manual slack adjuster as is well known in the art. The brake actuator support bracket 40 is attached to the cam shaft tube 36 for receipt of a brake actuator 41 such as an air motor or the like. As is well known in the art, the oscillitory motion of the actuator air motor is transmitted to the cam 32 by means of the lever body of the slack adjuster and the cam shaft 34.

For purposes of simplification of the illustration, the drum 12, the slack adjuster 39, the air motor 41, table 22 and friction material 24 are not shown in FIG. 2.

The general structure and operation of cam actuated expanding shoe drum brakes such as has been described briefly above is well known in the art and may be appreciated in further detail by reference to U.S. Pat. Nos. 3,497,037; 3,096,857 and 3,507,369, all of which are hereby incorporated by reference. Briefly, the brake assembly 10 illustrated in FIGS. 1 and 2 is shown in the radially retracted position whereat the brakes are not applied. When it is desired to retard motion of the brake drum 12, usually fixedly attached to the wheels of a vehicle, the brakes are actuated by actuating an actuation member such as air motor 41 or the like which will cause a counterclockwise rotation of cam 32 as seen in FIG. 1. Cam followers 42 are preferably in the form of rollers which are rotationally mounted to the ends of the brake shoe web 26 and caused to bear against the periphery of the working surfaces of the cam 32 by compression return springs 28. Counterclockwise rotation of cam 32 from the position illustrated in FIG. 1 will result in the cam followers 42 and the brake shoes being forced radially outwardly resulting in the generally arcuate brake shoes 20 pivoting radially outwardly about anchor pin 18 sufficiently to cause brake friction material 24 to frictionally engage brake drum 12. A subsequent clockwise rotation of cam 32 will cause the brake shoes to pivot radially inwardly to the brake release position shown in FIG. 1.

It is desirable to provide for the easy removal of the brake shoes for lining and relining purposes by providing a lift off type of brake shoe as will be described in greater detail below. As may be seen, the webs 26 of the brake shoes 20 are provided with a generally semi-annular concave cavity 44 at the end thereof opposite the ends in which the rollers or cam followers 42 are mounted. The concave cavities 44 are pivotably received and supported on the pivot pin or anchor member 18 and retained in engagement therewith by means of compression retaining springs 30. Once the brake drum is removed from surrounding the brake shoes, the brake shoes may easily by removed from the spider assembly by simply removing the rollers or cam followers 42 and the return spring 28 and then pivoting the shoes out of contact with the anchor pin 18.

The spider assembly 46 may be seen in greater detail by reference to FIGS. 3-8. The spider assembly 46 includes the spider member 14 which may be a stamping, a forging or a cost member having a generally annular aperture 48 therethrough for receipt of an axle housing or the like. At its upper end the spider member 14 has an aperture 50 therethrough for receipt of the cam shaft tube 36. At its lower end, spider member 14 has an aperture 52 therethrough for receipt of the anchor pin 18. A reinforcement plate 54 may be attached to the spider member 14 adjacent the opening 52 by means of rivets or other connectors to provide additional strength at this point without requiring additional weight about the entire spider member. Reinforcement plate 54 has an aperture 56 generally coaxial with and of the same radius as aperture 52 through spider member 14. Anchor pin 18 includes an externally threaded portion 58 at the rightward or inboard end thereof, a serrated splined or knurled portion 60 having a outer diameter 64 and an axial length equal to the combined axial length of bores 56 and 52 and designed to be non-rotatably pressed fit therein, a cantilevered pivot surface portion 62 having a diameter 68 greater than the diameter 64 of the bores 52 and 56 and of the outer diameter of portions 62 and 58, and a headed portion 66 having an outer diameter 69 only slightly greater than outer diameter 68. The outer diameter 68 of pivot surface portion 62 is generally equal to the inner diamter of concave cavities 44 and the axial length 70 of the pivot surface portion 62 is greater than the axial thickness 72 of the brake shoe web 26.

Anchor pin 18 is non-rotatably received within bores 56 and 52 of the spider member 14 with the shoulder 74 defined by the intersection of portions 60 and 62 flush against the outboard surface of spider member 14 or if utilized reinforcement plate 54. A nut member 76 and a lock washer 78 are utilized to retain the anchor pin in this position with the pivot surface portion 62 cantilevered from the outboard side of spider 14. A specially configured washer 80 is carried by the pivot support surface portion 62 of anchor pin 18 and is designed to be interposed between the headed portion 66 and the brake shoe web 26 to axially restrain the brake shoe 20 in proper position upon the anchor pin and spider assembly.

The use of the serrated portion 60, which is press fit into bores 56 and 52, prevents rotation of pin 18 relative to spider 14 and allows the same anchor pin to be utilized on both the right and left hand side of the vehicle. In the prior art, anchor pins having opposite hand threads were required for each side of the vehicle.

Figure 9:
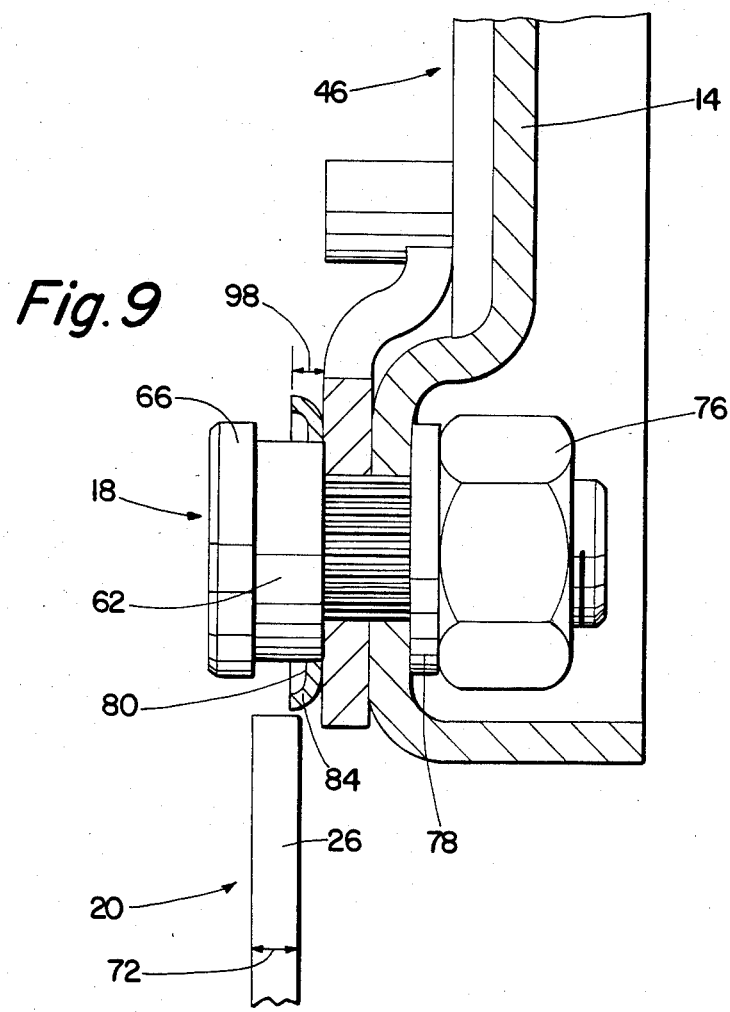
FIG. 9 is a partial sectional view of the spider assembly of the present invention with the specially configured washer improperly positioned and preventing assembly of the brake shoe to the spider.
Figure 5:
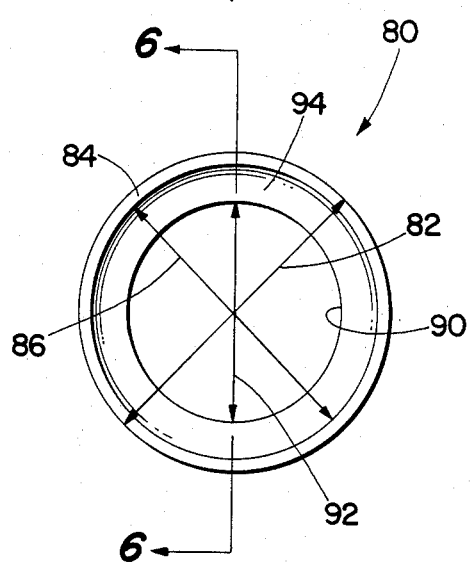
FIG. 5 is a side view, in section, of the specially configured washer of the present invention.
Figure 6:
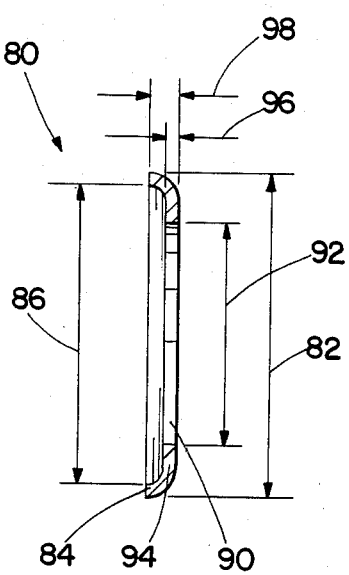
FIG. 6 is a front view of the washer in FIG. 5.

The washer 80, which may be seen in greater detail by reference to FIGS. 5 and 6, is of a generally cupped shaped configuration being generally concave in the outboard direction. Washer 80 is of an outer diameter 82 at the radially outer periphery of its axially extending portion 84 which outer diameter is greater than the inner diameter of concave cavities 44 and is sufficient to retain the webs 26 upon the anchor pins 18 as illustrated. The axially extending portions 84 of washer 80 define an inner diameter 86 which is greater than the outer diameter 69 of headed portion 66 of anchor pin 18 allowing the axially extending portion 84 of washer 80 to be telescopically received about the headed portion 66 of anchor pin 18 as may be seen by reference to FIG. 2. Washer 80 is provided with an internal throughbore 90 having an inner diameter 92 slightly greater than the outer diameter 68 of the pivot portion 62 of anchor pin 18 allowing the washer to be slidably received upon the pivot portion 62 of anchor pin 18. The radially extending portion 94 of washer 80 is of an axial thickness 96 selcted so that the sum total of axial thickness 96 of portion 94 and axial thickness 72 of shoe web 26 is slightly less than the axial length 70 of the pivot surface portion 62 of anchor pin 18. The total axial length 98 of washer 80 taken at the portion 84 is selected so that the sum total of axial thickness 98 of washer 80 and axial thickness 72 of brake shoe web 26 exceeds the axial length 70 of the pivot surface portion 62 of anchor pin 18. Accordingly, as may be seen by reference to FIG. 9, misassembly of the brake shoes to the spider assembly 46 by placement of washer 80 at the inboard rather than the outboard end of pivot surface 62 of anchor pin 18 is prevented.

Figure 7:
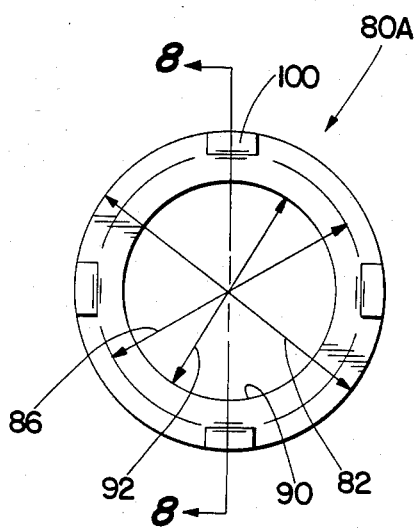
FIG. 7 is a side view, in section, of an alternate embodiment of a specially configured washer.
Figure 8:
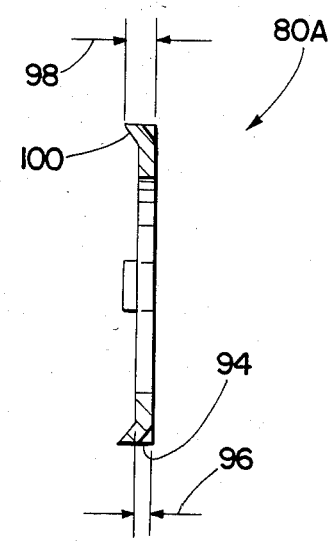
FIG. 8 is a front view of the washer of FIG. 7.

An alternate embodiment 80A of a specially configured washer for use in spider assembly 46 may be seen by reference to FIGS. 7 and 8. Washer 80A is similar to washer 80 in that it has an inner bore 90 of inner diameter 92, a radially extending portion 94 of axial thickness 96, and an outer diameter 82. At its outer periphery, washer 80A is provided with a plurality of axially extending projections 100 having an axial length 98 and projecting in the outboard direction from radially extending portion 94. While any number of projections 100 may be provided, at least three projections is desired. The radially inner surfaces of projections 100 define a diameter 86. The function and operation of washer 80A is identical to that of washer 80 described above.

In addition to preventing misassembly of the brake shoes 20 to the anchor pin assembly 46 by placing the washer 80 or 80A at the inboard end of pivot surface portion 62 of anchor pin 18, misassembly of the washer 80 or 80A to anchor pin 18 by placing the washer on the anchor pin with the radially extending portions 84 or 100, respectively, facing in the inboard direction is readily apparent as in this incorrect configuration the brake shoe web 26 will not fit between the washer and the headed portion 66 nor between the washer and the outboard surface of reinforcement plate 54.

It may thus be seen, that a spider assembly for a drum brake of the cantilever mounted anchor pin type has been provided which utilizes an anchor pin in combination with a specially configured washer which provides a large bearing area to axially restraining the brake shoe web or webs upon the cantilever mounted anchor pin and which utilizes an anchor pin which may be produced from a piece of bar stock material having a considerably smaller radius than the radius of the required bearing area. Additionally, the specially configured washer in combination with the structure of the cantilever mounted anchor pin positively prevents assembly of the brake shoe to the spider assembly when the washer has been misassembled to the spider assembly or mispositioned thereon.

Figure 10:
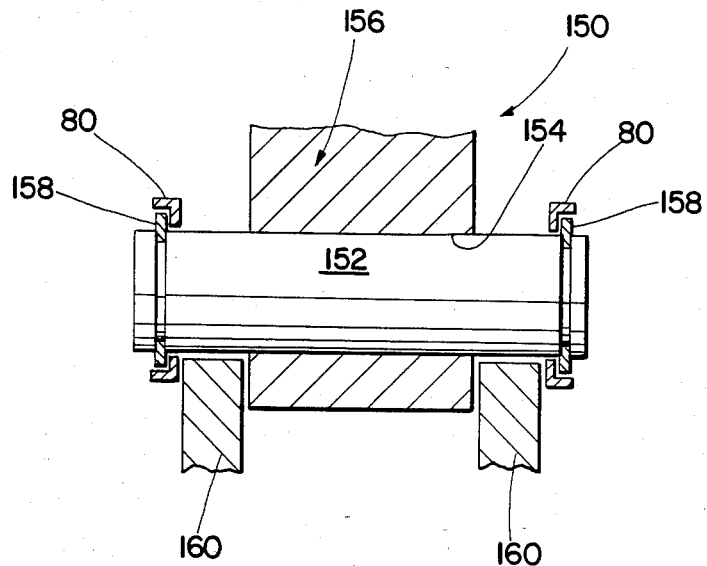
FIG. 10 is a partial sectional view of an alternate embodiment of the present invention as utilized in a straddle type drum brake.

As may be seen by reference to FIG. 10, washers 80 or 80A may be advantageously utilized in a straddle type drum brake 150. An anchor pin 152 is removably received in the bore 154 of a spider 156. A pair of snap rings 158 retain the anchor pin in the spider for support of shoe webs 160 and snap rings 158, washers 80 are utilized. The structure of washers 80 prevents assembly of webs to the anchor pin unless the washers are properly positioned between the webs and snap rings.

Although this invention has been described in its preferred embodiment with a certain degree of particularity, it is understood such description is by way of example only and that certain modifications are possible within the spirit and the scope of the invention as hereinafter claimed.

I claim:

1. A spider assembly for an expanding shoe drum brake of the type utilizing cantilever anchor pin mounting wherein the brake shoes are pivotably supported at a generally concave cavity structure defined in one end of the brake shoe web structure on an anchor pin structure extending outwardly from the outboard side of the spider member, said assembly comprising;

a spider member having a centrally located mounting portion adapted for non-rotational mounting to a vehicle, an actuator support portion at one end thereof and an anchor pin support portion at the other end thereof, said anchor pin support portion defining an anchor pin receiving bore therethrough;

an anchor pin received in said anchor pin receiving bore, said anchor pin defining a first portion received in said anchor pin receiving bore, a pivot surface portion extending from said anchor pin receiving bore in the outboard direction and of a larger outer diameter than the inner diameter of said anchor pin receiving bore, said pivot surface portion outer diameter generally equal to the inner diameter of said concave cavities, said pivot surface portion of a greater axial length than the axial width of said brake shoe webs, and a slightly enlarged headed portion at the outboard end of said anchor pin;

a generally annular washer slidably received on said pivot surface portion, said washer having a generally flat radially extending portion with a centrally located aperture therethrough for receipt of said pivot surface portion, the inner diameter of said aperture being smaller than the outer diameter of said headed portion, said radially extending portion of a greater outer diameter than the inner diameter of said concave cavity, and an axially extending portion extending in the outboard direction from the outer periphery of said radially extending portion, said radially extending portion having an axial thickness less than the difference between the axial length of said pivot surface portion and the axial width of said web structure, the combined axial width of said radially extending portion and said axially extending portion of said washer greater than the difference between the axial length of said pivot surface portion and the axial width of said web structure, said axially extending portion extending generally perpendicularly from said radially extending portion and defining an inner diameter surface having a radius greater than the outer diameter radius of said headed portion.

2. The spider assembly of claim 1 wherein said anchor pin is removably retained in said anchor pin receiving bore, said first portion of said anchor pin extending from the inboard and of said anchor pin receiving bore for cooperation with a fastening means.

3. The spider assembly of claim 1 wherein said washer is of a generally cupped shape cross section.

4. The spider assembly of claim 1 wherein said axially extending portion of said washer comprises at least three equally spaced separated projections projecting from the outer periphery of said generally flat radially extending portion of said washer.

5. The spider assembly of claim 2 wherein said first portion of said anchor pin is provided with external threads thereon and said fastening means comprise an internally threaded nut received on said threaded portion for urging the inboard end of said pivot support portion of said anchor pin into contact with the outboard end of said anchor pin receiving bore.

6. The spider assembly of claim 5 wherein said first portion of said anchor pin is provided with a knurled exterior periphery between the threaded part thereof and said pivot surface portion, the outer diameter of said knurled outer periphery being of a slightly larger outer diameter than the inner diameter of said anchor pin receiving bore whereby said anchor pin is non-rotatably received in said anchor pin receiving bore in a pressed fit.

7. The spider assembly of claim 1 wherein said first portion of said anchor pin is provided with a knurled exterior periphery between the threaded part thereof and said pivot surface portion, the outer diameter of said knurled outer periphery being of a slightly larger outer diameter than the inner diameter of said anchor pin receiving bore whereby said anchor pin is non-rotatably received in said anchor pin receiving bore in a pressed fit.

8. A spider assembly for an expanding shoe drum brake of the type utilizing straddle brake shoe web mounting wherein the brake shoe webs are pivotably supported at a generally concave cavity structure defined in one end of the brake shoe web structure on an anchor pin structure extending outwardly from both the inboard and the outboard side of the spider member, said assembly comprising;

a spider member having a centrally located mounting portion adapted for non-rotational mounting to a vehicle, an actuator support portion at one end thereof and an anchor pin support portion at the other end thereof, said anchor pin support portion defining an anchor pin receiving bore therethrough;

an anchor pin received in said anchor pin receiving bore, said anchor pin defining a first portion received in said anchor pin receiving bore, a pair of pivot surface portions extending from said anchor pin receiving bore in both the inboard and the outboard directions and of substantially the same outer diameter as the inner diameter of said anchor pin receiving bore, said pivot surface portions outer diameters generally equal to the inner diameter of said concave cavities, said pivot surface portion of a greater axial length than the axial width of said brake shoe webs, and a snap ring groove at the axially outer end of each of said pivot surface portions;

a snap ring received in each of said snap ring grooves;

a generally annular washer slidably received on each of said pivot surface portions, said washer having a generally flat radially extending portion with a centrally located aperture therethrough for receipt of said pivot surface portion, the inner diameter of said aperture being smaller than the outer diameter of said snap rings, said radially extending portion of a greater outer diameter than the inner diameter of said concave cavity, and an axially extending portion extending in the direction away from said spider from the outer periphery of said radially extending portion, said radially extending portion having an axial thickness less than the difference between the axial length of said pivot surface portion and the axial width of said web structure, the combined axial width of said radially extending portion and said axially extending portion of said washer greater than the difference between the axial length of said pivot surface portion and the axial width of said web structure, said axially extending portion extending generally perpendicularly from said radially extending portion and defining an inner diameter surface having a radius greater than the outer diameter radius of said snap rings.

9. The spider assembly of claim 8 wherein said washer is of a generally cupped shape cross section.

* * * * *